(12) United States Patent
Walker (10) Patent No.: US 9,756,519 B2
(45) Date of Patent: Sep. 5, 2017

(54) COMMUNICATION SIGNAL RATE DETECTION SYSTEM

(71) Applicant: Christopher W. Walker, Rancho Palos Verdes, CA (US)

(72) Inventor: Christopher W. Walker, Rancho Palos Verdes, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/183,407

(22) Filed: Jun. 15, 2016

(65) Prior Publication Data

US 2016/0381584 A1    Dec. 29, 2016

Related U.S. Application Data

(60) Provisional application No. 62/184,099, filed on Jun. 24, 2015.

(51) Int. Cl.
| | | |
|---|---|---|
| *H04W 24/08* | (2009.01) | |
| *H04L 29/08* | (2006.01) | |
| *H04W 72/08* | (2009.01) | |
| *H04L 25/02* | (2006.01) | |

(52) U.S. Cl.
CPC ......... *H04W 24/08* (2013.01); *H04L 25/0262* (2013.01); *H04L 67/303* (2013.01); *H04W 72/085* (2013.01)

(58) Field of Classification Search
CPC .. H04W 24/08; H04W 72/086; H04L 43/028; H04L 41/142; H04L 67/303
See application file for complete search history.

(56) References Cited

U.S. PATENT DOCUMENTS

| 2006/0067446 A1* | 3/2006 | Maeda | H04B 1/1027 375/349 |
| 2006/0182193 A1* | 8/2006 | Monsen | H04L 25/03057 375/267 |
| 2007/0254590 A1 | 11/2007 | Lopez | |
| 2008/0226001 A1* | 9/2008 | Geng | H04B 1/1036 375/350 |
| 2016/0192217 A1* | 6/2016 | Hinson | H04W 24/08 455/67.11 |

FOREIGN PATENT DOCUMENTS

| DE | 102011000556 A1 | 8/2012 |
| WO | WO2009/128002 A | 10/2009 |

OTHER PUBLICATIONS

International Search Report for corresponding PCT/US2016/037627; dated Sep. 12, 2016.

\* cited by examiner

*Primary Examiner* — Dac Ha
(74) *Attorney, Agent, or Firm* — Tarolli, Sundheim, Covell & Tummino LLP (57) ABSTRACT

One example includes a rate detector system. The rate detector system includes a plurality of energy detectors configured to receive an input signal and to filter separate respective frequency bands associated with the input signal to generate separate respective energy profiles. The system also includes an energy processing component configured to determine a symbol rate of the input signal based on a statistical evaluation of a ratio of the separate respective energy profiles.

18 Claims, 3 Drawing Sheets

COMMUNICATION SIGNAL RATE DETECTION SYSTEM

RELATED APPLICATIONS

This application claims priority from U.S. Provisional Patent Application Ser. No. 62/184,099, filed 24 Jun. 2015, which is incorporated herein in its entirety.

This invention was made with Government support. The Government has certain rights in this invention.

TECHNICAL FIELD

This disclosure relates generally to communication systems, and specifically to a communication signal rate detection system.

BACKGROUND

In some communication systems, such as wireless communication systems, a signal can be transmitted at a symbol rate that can change and/or can be unknown at the receiver. Thus, rate detection of the incoming signal to the signal receiver can be important in many communication systems. As an example, a system designer can require the transmitter to send the symbol rate over a separate channel to the receiver. However, transmission of the symbol rate on a separate channel can require additional communication overhead, such that some of the communication spectrum (e.g., frequency spectrum) is dedicated to this purpose and not to the transmission of data. Alternatively, the overhead rate information can be shared on the data channel with the transmitted data. However, such a rate transmission methodology can diminish the time allocated to data transmission based on providing the rate information on the same communication channel.

SUMMARY

One example includes a rate detector system. The rate detector system includes a plurality of energy detectors configured to receive an input signal and to filter separate respective frequency bands associated with the input signal to generate separate respective energy profiles. The system also includes an energy processing component configured to determine a symbol rate of the input signal based on a statistical evaluation of a ratio of the separate respective energy profiles.

Another example includes a method for detecting a symbol rate of an input signal. The method includes providing the input signal to a first energy detector and filtering the input signal based on a first bandwidth associated with the first energy detector to generate a first energy profile of the input signal. The method also includes providing the input signal to a second energy detector and filtering the input signal based on a second bandwidth associated with the second energy detector to generate a second energy profile of the input signal. The second bandwidth can partially overlap the first bandwidth. The method can also include generating a ratio of the first and second energy profiles and statistically analyzing the ratio of the first and second energy profiles. The method further includes determining the symbol rate of the input signal based on the statistical analysis of the ratio of the first and second energy profiles.

Another example includes a receiver system. The system includes an antenna configured to receive a wireless input signal and an analog-to-digital converter (ADC) configured to convert the wireless input signal to a digital input signal. The system also includes a rate detector configured to filter separate respective frequency bands associated with the input signal to generate separate respective energy profiles and to determine a symbol rate of the input signal based on a statistical evaluation of a ratio of the separate respective energy profiles. The system further includes a demodulator configured to receive and demodulate the digital input signal based on the determined symbol rate of the digital input signal.

DETAILED DESCRIPTION

This disclosure relates generally to communication systems, and specifically to a communication signal rate detection system. The rate detection system includes a plurality of energy detectors that are configured to receive an input signal, such as a signal that is wirelessly transmitted to an associated receiver system, and to filter separate respective frequency bands associated with the input signal to generate separate respective energy profiles. As an example, each of the energy detectors can include a band-pass filter that is configured to filter the separate respective frequency bands and a smoothing function component configured to smooth the respective filtered portion of the input signal over a predetermined duration of the input signal to generate the respective energy profile. For example, a first of the energy detectors can include a filter that is configured to filter a first frequency band, and a second of the energy detectors can include a filter that is configured to filter a second frequency band, with the second frequency band being at least partially subsumed by the first frequency band. The input signal can be, for example, a digital input signal that is provided from an analog-to-digital converter (ADC) of an associated receiver system. Alternatively, the input signal can be an analog signal.

The energy profiles are provided to a rate processing component that is configured to determine the symbol rate based on a ratio of the separate respective energy profiles. As an example, the energy profiles can be provided to a ratio calculator that is configured to calculate the ratio. The rate processing component can also include a decision logic component that is configured to determine the symbol rate based on a statistical evaluation of the ratio of the separate respective energy profiles. As an example, the rate processing component is configured to determine that the symbol rate of the input signal is one of a plurality of predetermined symbol rates based on comparing a statistical parameter associated with the sample mean ratio with at least one predetermined threshold. The statistical parameter can include, for example, at least one of the sample mean of the ratio and a sample standard deviation of the ratio. The at least one predetermined threshold can correspond to divisions of the statistical parameter with respect to the separate respective ones of the predetermined symbol rates. As another example, the rate processing component can be configured to determine the symbol rate by calculating a maximum Quality of Service (QoS) based on a Gaussian density associated with the ratio of the respective energy profiles relative to each of the plurality of predetermined symbol rates. As yet another example, the rate processing component can be configured to determine the symbol rate based on maximizing the likelihood function corresponding to an F-distribution associated with each of the plurality of predetermined symbol rates.

Figure 1:
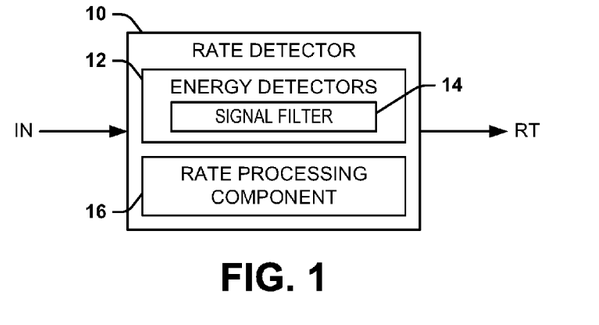
FIG. 1 illustrates an example of a rate detection system.

FIG. 1 illustrates an example of a rate detection system 10. The rate detection system 10 can be implemented in any of a variety of receiver systems in which a transmitted signal, demonstrated in the example of FIG. 1 as an input signal IN, can have a variable and/or unknown symbol rate. Therefore, the rate detection system 10 can determine the symbol rate RT of the input signal IN, such that the rate detection system 10 can provide the determined symbol rate RT to an associated demodulator to demodulate the input signal IN based on the determined symbol rate RT. The input signal IN can be provided to the rate detection system 10 as a digital signal, such that the rate detection system 10 operates in the digital domain. However, it is to be understood that the input signal IN can instead be provided as an analog signal, such that at least portions of the rate detection system 10 can operate in the analog domain.

The rate detection system 10 includes a plurality of energy detectors 12 that are configured to provide a respective plurality of energy profiles associated with the input signal IN. In the example of FIG. 1, each of the energy detectors 12 includes a signal filter 14 configured to provide band-pass filtering of the input signal IN. As an example, the pass-band of each signal filter 14 of the energy detectors 12 can be associated with a different frequency band. For example, the rate detection system 10 can include two energy detectors 12, with the pass-band of the signal filter 14 of one of the energy detectors 12 at least partially overlapping, and possibly subsuming, the pass-band of the signal filter 14 of the other of the energy detectors 12. Therefore, the energy detectors 12 can provide the respective energy profiles based on filtering the input signal IN via the respective pass-bands, such that the respective energy profiles are associated with the respective pass-bands. In addition, each of the energy detectors 12 can implement a smoothing function that is configured to provide smoothing of the respective energy profiles.

The rate detection system 10 also includes a rate processing component 16 that is configured to determine the symbol rate RT based on a statistical analysis of a ratio associated with the respective energy profiles. As an example, the symbol rate RT can correspond to one of a plurality of predetermined symbol rates, such that the rate detection system 10 can determine in which of the plurality of predetermined symbol rates that the input signal IN is provided. For example, the rate processing component 16 can include a ratio calculator that is configured to calculate the ratio of the energy profiles. Based on the separate pass-bands of the signal filters 14 of the respective energy detectors 12, the ratio can change based on the symbol rate of the input signal IN. As an example, the signal filter 14 of a first energy detector 12 can have a relative broad pass-band and can provide the numerator of the ratio of the energy profiles, while the signal filter 14 of a second energy detector 12 can have a relative narrow pass-band and can provide the denominator of the ratio of the energy profiles. Therefore, while changes to the symbol rate may not have a significant effect on the numerator of the ratio, such changes can have a much more significant effect on the denominator, and can thus greatly change the ratio.

The rate processing component 16 can thus provide the statistical evaluation of the ratio (e.g., the sample mean ratio) to determine the symbol rate RT, such as in one of a variety of different ways. As a first example, the rate processing component 16 can determine that the symbol rate RT of the input signal IN based on comparing a statistical parameter associated with the ratio with at least one predetermined threshold. The statistical parameter can include, for example, at least one of a sample mean and a sample standard deviation of the ratio of the energy profiles. The one or more predetermined thresholds can correspond to divisions of the respective statistical parameter(s) with respect to the separate respective ones of the predetermined symbol rates, such that the symbol rate RT can correspond to one of the predetermined symbol rates based on a comparison of the statistical parameter(s) relative to the predetermined threshold(s). As a second example, the rate processing component 10 can determine the symbol rate RT by calculating a maximum Quality of Service (QoS) based on a Gaussian density function associated with the ratio of the respective energy profiles relative to each of the plurality of predetermined symbol rates. As a third example, the rate processing component can be configured to determine the symbol rate based on maximizing the likelihood function corresponding to an F-distribution associated with the ratio of the respective energy profiles relative to each of the plurality of predetermined symbol rates. For example, the second and third examples can be better suited for an input signal IN that has a higher possible range of signal-to-noise ratio (SNR).

In response to determining the symbol rate RT, the symbol rate RT can be provided to a respective demodulator of the associated receiver system, along with the input signal IN. Accordingly, the demodulator can demodulate the input signal IN at the symbol rate RT to determine the corresponding transmitted data in the baseband signal. As a result, the rate detection system 10 can allow the associated receiver system to demodulate the input signal IN having an unknown and/or variable symbol rate based solely on the input signal IN. Thus, the rate detection system 10 can determine the symbol rate RT without requiring additional transmission overhead, such as in typical receiver systems that provide the symbol rate over a separate transmission channel, or requiring additional demodulation time, such as in typical receiver systems that provide the symbol rate on the same transmission channel.

Therefore, as described herein, the rate detection system 10 provides a way to perform rate detection that is robust and can be implemented in hardware in a relatively simple manner. The rate detection system 10 implements the ratio of two energy detectors that are each matched to a different bandwidth, with each bandwidth being selected based on the possible symbol rates of the input signal IN. By implementing the ratio of the detected energy of the input signal IN via the separate energy detectors, any scaling of the power that may have occurred in prior processing at the receiver system is substantially cancelled, given that the scaling would be common to both the numerator and the denominator of the ratio. In addition, the rate detection system 10 can be configured to detect any of a variety of data rates, and is not limited to data rates that differ by powers of two, such as in certain code-division multiple access (CDMA) schemes that implement repetition accumulators, but can instead distinguish between data rates that are separated by other factors (e.g., including irrational factors) based on the use of the separate bandwidth energy detectors in generating the ratio.

Figure 2:
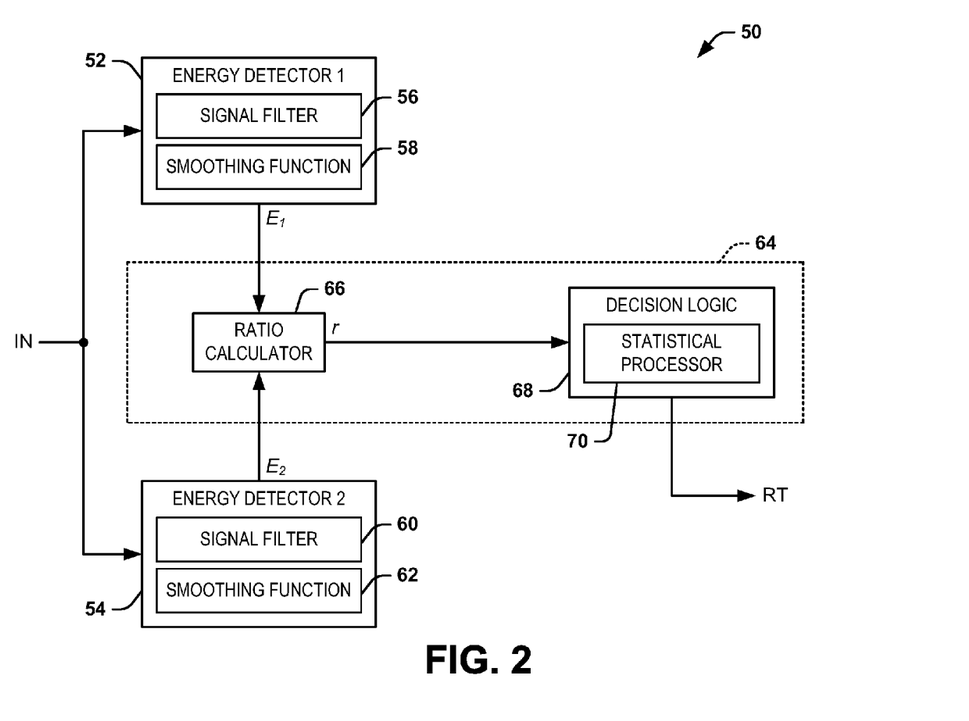
FIG. 2 illustrates another example of a rate detection system.

FIG. 2 illustrates another example of a rate detection system 50. The rate detection system 50 can correspond to an example of the rate detection system 10 in the example of FIG. 1. Therefore, the rate detection system 50 can determine the symbol rate RT of the input signal IN, such that the rate detection system 50 can provide the determined symbol rate RT to an associated demodulator to demodulate the input signal IN based on the determined symbol rate RT. As an example, the symbol rate RT can correspond to one of a plurality of predetermined symbol rates, such that the rate detection system 50 can determine in which of the plurality of predetermined symbol rates that the input signal IN is provided. The input signal IN can be provided to the rate detection system 50 as a digital signal having M samples, such that the rate detection system 50 operates in the digital domain, where M corresponds to a length of data used in measuring the energy of the input signal IN. However, it is to be understood that the input signal IN can instead be provided as an analog signal, such that at least portions of the rate detection system 50 can operate in the analog domain.

The rate detection system 50 includes a first energy detector 52 and a second energy detector 54 that are each configured to receive the input signal IN. As an example, the input signal IN can be provided as a digital signal, such as from an analog-to-digital converter (ADC). The first energy detector 52 includes a signal filter 56 and a smoothing function component 58, and the second energy detector 54 includes signal filter 60 and a smoothing function component 62. The signal filters 56 and 60 are configured as pass-band or low-pass filters that are configured to filter the input signal IN. As an example, the signal filters 56 and 60 can be associated with a different frequency band. For example, the signal filter 56 can have a relatively large pass-band, and the signal filter 60 can have a relatively smaller pass-band that is mostly subsumed by the pass-band of the signal filter 56.

The smoothing function components 58 and 62 are configured to implement a smoothing function that is configured to provide smoothing of the respective filtered portions of the input signal IN to generate respective energy profiles $E_1$ and $E_2$ associated with the input signal IN. As an example, the smoothing function components 58 and 62 can be configured approximately the same with respect to each other to provide the respective energy profiles $E_1$ and $E_2$ associated with the input signal IN. For example, each of the smoothing function components 58 and 62 can implement a summation function of an absolute value square term of the filtered portion of the input signal IN. As an example, the smoothing functions 58 and 62 can generate the energy profiles $E_1$ and $E_2$ as non-central chi-squared random variables for an input signal IN that has complex Gaussian (or normal) noise statistics, which can be expressed as follows:

$$E_1 = \sum_{n=1}^{M} |y_1(n)|^2 \quad \text{Equation 1}$$

$$E_2 = \sum_{n=1}^{M} |y_2(n)|^2 \quad \text{Equation 2}$$

Where: $y_1(n)$ corresponds to a given one of M samples of the input signal IN that has been filtered by the signal filter 56; and
$y_2(n)$ corresponds to a given one of M samples of the input signal IN that has been filtered by the signal filter 60.

While the smoothing function components 58 and 62 are described as summation functions in the digital domain, it is to be understood that the smoothing functions 58 and 62 can be configured to operate instead in the analog domain. As an example, the signal filters 56 and 60 can be configured as analog filters instead of digital filters. Thus, the signal filters 56 and 60 can provide the analog filtered portions of the input signal IN to the smoothing function components 58 and 62. Therefore, the smoothing function components 58 and 62, instead of implementing the summations demonstrated in Equations 1 and 2, can be configured to implement an integral of a predetermined duration of T seconds of the input signal IN. The energy profiles $E_1$ and $E_2$ can thus be provided as analog energy portions that can be converted to the digital domain.

The rate detection system 50 also includes a rate processing component 64. The rate processing component 64 can be configured as or as part of a processor chip (e.g., application specific integrated circuit (ASIC)) or as a software component operating on a processor. The rate processing component 64 includes a ratio calculator 66 that is configured to calculate a ratio r of the energy profiles $E_1$ and $E_2$ based on which the rate processing component 64 can determine the symbol rate RT of the input signal IN. In the example of FIG. 2, the ratio calculator 66 can generate the ratio r based on the energy profile $E_1$ as a numerator and the energy profile $E_2$ as a denominator. Based on the separate pass-bands of the signal filters 56 and 60, the ratio r can change based on the different symbol rates of the input signal IN. As described previously, the signal filter 56 can have a relative broad pass-band, and the signal filter 60 can have a relative narrow pass-band. Therefore, while changes to the symbol rate may not have a significant effect on the energy profile $E_1$, and thus the numerator of the ratio r, such changes can have a much more significant effect on the energy profile $E_2$, and thus the denominator of the ratio r, and can thus greatly change the ratio r.

The rate processing component 64 also includes a decision logic component 68 that is configured to determine the symbol rate RT of the input signal IN based on a statistical analysis of the ratio r. In the example of FIG. 2, the decision logic component 68 includes a statistical processor 70 that is configured to calculate at least one statistical parameter of the ratio r. As an example, the energy profiles $E_1$ and $E_2$ can be normalized by degrees of freedom, and the ratio r can be expressed by the ratio calculator 66 as a random variable with a scaled doubly non-central F-distribution (hereafter referred to as the F-distribution). For example, the probability density function for the F-distribution can be expressed as:

$$P(n_1, n_2; \lambda_1, \lambda_2; x) = \quad \text{Equation 3}$$

$$\frac{1}{L} \sum_{k=0}^{\infty} \sum_{j=0}^{\infty} \frac{n_1^{k+n_1/2} n_2^{k+n_2/2} (x/L)^{k+n_1/2-1} \lambda_1^k \lambda_2^k}{2^{k+j} k!! e^{(\lambda_1+\lambda_2)/2} B(k+n_1/2, j+n_2/2)}$$

$$(n_2 + n_1 x/L)^{-(k+j)-(n_1+n_2)/2}$$

Where: k!! denotes the double factorial;
$n_1$ and $n_2$ are the numerator and denominator degrees of freedom, respectively; a, $\lambda_1$ and $\lambda_2$ are the numerator and denominator normalized non-central parameters, respectively, expressed as:

$$\lambda_k = \sum_{j=1}^{M} \frac{|\mu_{in}|^2}{\sigma_{in,k}^2} = M \frac{|\mu_{in}|^2}{\sigma_{in,k}^2}, k = 1, 2; \quad \text{Equation 4}$$

$$L = \frac{\sigma_{in,1}^2}{\sigma_{in,2}^2}; \quad \text{Equation 5}$$

Where: $\mu_{in}$ is a complex mean value of the signal amplitude after filtering;

$\sigma_{in,k}$ is a standard deviation of an additive complex noise about the mean of the signal amplitude with k=1 denoting the numerator and k=2 denoting the denominator after filtering;

and B is a beta function that can be expressed as:

$$B(\alpha, \beta) = \int_0^1 y^{\alpha-1}(1-y)^{\beta-1} dy. \quad \text{Equation 6}$$

The resulting likelihood function for the ratio corresponding to this F-distribution can be expressed as:

$$L(\lambda_1, \lambda_2 \mid r) = \prod_{k=1}^{N} P(n_1, n_2; \lambda_1, \lambda_2; r(k)) \quad \text{Equation 7}$$

Where: r(k) denotes the $k^{th}$ ratio in a collection of N ratios composing r; and r is a vector composed of N ratios.

The corresponding detected signal can thus be determined (e.g., from a lookup table). Therefore, for each signal rate RT and set of $E_b/N_0$ factors that are computed in advance, the values of the numerator and denominator non-central parameters and L that correspond to each signal rate RT are considered by the statistical processor 70. The statistical processor 70 can then evaluate the likelihood function in Equation 3 using all possible values of $\lambda_1$, $\lambda_2$, and L, such as stored in the associated lookup table, to determine the best match by identifying which set maximizes the likelihood function. Such evaluation also enables the statistical processor 70 to obtain an estimate of the $E_b/N_0$ factor, as well, since the $E_b/N_0$ values are stored along with the $\lambda_1$, $\lambda_2$, and L values in the lookup table.

As another example, it can be assumed that $n=n_1=n_2$, and the value of n can be large enough that the ratio r is well approximated by a Gaussian (or normal) distribution. The Gaussian approximation can form a quality of service QoS metric (or likelihood function) which can be maximized to produce a maximum a posteriori (MAP) or maximum likelihood estimator (MLE) estimator (MAP=MLE with equiprobable signals), which can be expressed as:

$$QoS_k = \prod_{k=1}^{N} \frac{1}{\sqrt{2\pi\sigma_k^2/Nsnaps}} \exp\left(-\frac{(\bar{r}(j)-\mu_k)^2}{2\sigma_k^2/Nsnaps}\right), \quad \text{Equation 8}$$

$$k = 1, 2, \ldots, D_s$$

$$\bar{r}(j) = \frac{1}{Nsnaps} \sum_{k=Nsnaps\times(j-1)+1}^{j\times Nsnaps} r(k), \quad \text{Equation 9}$$

$$j = 1, 2, \ldots, N$$

Where: k is an index pointing to one of the possible values for the parameter;

Nsnaps is the number of snapshots used in smoothing the ratio r;

N is the number of observations obtained after smoothing;

$\mu_k$ is an a priori identified mean of the ratio r for a respective index k;

$\sigma_k$ is an a priori identified standard deviation of the ratio r before smoothing for a respective index k;

$\bar{r}(j)$ corresponds to a given one of the N observations of the smoothed ratios;

$E_b/N_0$ is a bit energy to noise ratio; and $D_s$ is a dictionary size corresponding to a number of distinct signals times the number of distinct $E_b/N_0$ factors considered.

As described in the example of Equation 7, the term "snapshot" refers to the length of the data used to measure the energy before the ratio r is computed.

Based on the example of Equation 7, an index k that corresponds to a maximum quality of service QoS can be determined. As an example, Equation 7 can be modified as follows:

$$\max_k QoS_k = b_k - \sum_{j=1}^{N} \frac{(\bar{r}(j)-\mu_k)^2}{d_k}, k = 1, 2, \ldots, D_s, \quad \text{Equation 10}$$

$$b_k = -\frac{N}{2} \ln(2\pi\sigma_k^2/Nsnaps) \quad \text{Equation 11}$$

$$d_k = -2\sigma_k^2/Nsnaps \quad \text{Equation 12}$$

The corresponding detected signal can thus be determined (e.g., from a lookup table). Therefore, for each signal rate RT and set of $E_b/N_0$ factors that are computed in advance, the values of the corresponding mean $\mu_k$ and standard deviation $\sigma_k$ that correspond to each signal rate RT are considered by the statistical processor 70. The statistical processor 70 can then evaluate Equation 8 using all possible values of $\mu_k$ and $\sigma_k$, such as stored in the associated lookup table, to determine the best match by identifying which set of parameters maximize the QoS likelihood function. This also enables the statistical processor 70 to obtain an estimate of the $E_b/N_0$ factor, as well, since the $E_b/N_0$ values are stored along with the $\mu_k$ and $\sigma_k$ values in the lookup table.

As another example, the statistical parameter of the ratio r can be or can include, for example, a sample mean of the ratio r, namely $\bar{r}$, associated with a predetermined number of samples of the input signal IN. The ratio $\bar{r}$ can be expressed as in Equation 9 above with N=1. As an example, the statistical processor 70 can determine the symbol rate RT of the input signal IN based on comparing $\bar{r}$ with at least one predetermined threshold if the range of $E_b/N_0$ values is not too large. As another example, the statistical parameter of the ratio r can be or can include, for example, a sample standard deviation of the ratio r, namely $s_r$, associated with a predetermined number of samples of the input signal IN. The sample standard deviation $s_r$ can be expressed as:

$$s_r = \sqrt{\frac{1}{Nsnaps-1} \sum_{k=1}^{Nsnaps} (r(k) - \bar{r})^2} \qquad \text{Equation 13}$$

As an example, the statistical processor 70 can determine the symbol rate RT of the input signal IN based on comparing $s_r$ with at least one predetermined threshold if the range of $E_b/N_0$ values is not too large. In the case of either a small or a large range of $E_b/N_0$ values, $\bar{r}$ in conjunction with $s_r$ can be compared to at least one set of two-dimensional thresholds to determine the symbol rate RT.

Figure 3:
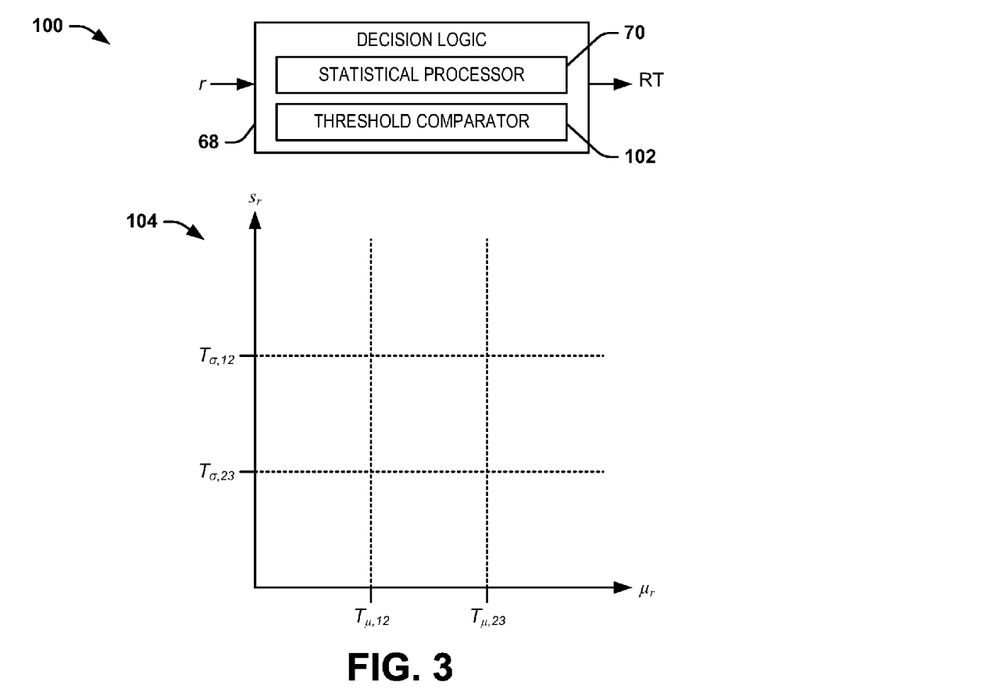
FIG. 3 illustrates an example of a diagram of a statistical evaluation for determining a symbol rate of an input signal.

FIG. 3 illustrates an example of a diagram 100 of a statistical evaluation for determining the symbol rate RT of the input signal IN. The diagram 100 demonstrates the decision logic component 68 associated with the rate detection system 50. Therefore, reference is to be made to the example of FIG. 2 in the following description of the example of FIG. 3.

In the example of FIG. 3, in addition to the statistical processor 70, the decision logic component 68 also includes a threshold comparator 102 that is configured to compare a statistical parameter associated with the ratio r to at least one predetermined threshold, such as can be preprogrammed or programmable. As a first example, the threshold comparator 102 is configured to compare $\bar{r}$ with the threshold(s). As a second example, the threshold comparator 102 is configured to compare a sample standard deviation of r, denoted $s_r$, with one or more threshold(s). As yet a third example, the threshold comparator 102 is configured to compare a combination of $\bar{r}$ and the sample standard deviation $s_r$ with separate respective threshold(s).

In the example of FIG. 3, the diagram 100 includes a threshold graph 104 that demonstrates thresholds that are defined with respect to a graph on which the actual standard deviation, $\sigma_r$, can be plotted as a function of the actual mean ratio $\mu_r$ for a given $E_b/N_0$. The threshold graph 104 demonstrates a first predetermined standard deviation threshold $T_{\sigma,12}$ and a second predetermined standard deviation threshold $T_{\sigma,23}$. The predetermined standard deviation thresholds $T_{\sigma,12}$ and $T_{\sigma,23}$ can correspond to approximate divisions between symbol rates RT of the input signal IN. In addition, the threshold graph 104 demonstrates a first predetermined mean threshold $T_{\mu,12}$ and a second predetermined mean threshold $T_{\mu,23}$ Similar to the predetermined standard deviation thresholds $T_{\sigma,12}$ and $T_{\sigma,23}$, the predetermined mean thresholds $T_{\mu,12}$ and $T_{\sigma,23}$ can correspond to approximate divisions between symbol rates RT of the input signal IN. Thus, the threshold graph 104 demonstrates separate respective regions of the standard deviation $s_r$ and/or $\mu_r$ that can be determinative of the symbol rate RT of the input signal IN, as long as the range of $E_b/N_0$ is not too large.

As an example, using the Gaussian approximation described previously in the example of FIG. 2, when the rate $k \in \{1,2,3\}$ symbol rate is provided, the ratio is accurately approximated as normal with mean $\mu_k$ and standard deviation $\sigma_k$. Thus, a direct analysis yields that the optimal threshold, $T_{\mu,12}$ to separate the low rate and the medium rate regions of the threshold graph 104 and the optimal threshold, $T_{\mu,23}$ to separate the medium rate and the high rate regions of the threshold graph 104 corresponding to the predetermined thresholds can be defined as follows:

$$T_{\mu,12} = \frac{\mu_1 \sigma_2 + \mu_2 \sigma_1}{\sigma_1 + \sigma_2} \qquad \text{Equation 14}$$

$$T_{\mu,23} = \frac{\mu_2 \sigma_3 + \mu_3 \sigma_2}{\sigma_2 + \sigma_3} \qquad \text{Equation 15}$$

As an example, the energy detectors 52 and 54 in the example of FIG. 2 can be implemented as filters, such as infinite impulse response (IIR) filters. For example, pole locations for the energy detectors 52 and 54 that are implemented as IIR filters can be selected to maximize the spacing between the expected values of the means corresponding to the different data rates RT. Thus, the statistical processor 70 can determine the decision region in the threshold graph 104 in which the statistical parameter (e.g., $\bar{r}$ or $s_r$) resides to determine the corresponding data rate RT. As another example, the statistical processor 70 can provide greater discrimination by combining $\bar{r}$ and $s_r$ and checking the measurements against the appropriately designed decision regions of the threshold graph 104 to determine the correct data rate RT.

While the threshold graph 104 is demonstrated as a two-dimensional graph associated with both the sample standard deviation $s_r$ and the sample mean $\bar{r}$, the threshold graph 104 could instead be a one-dimensional graph that can be implemented to determine the symbol rate RT based on only one of $s_r$ or $\bar{r}$. Additionally, while the threshold graph 104 demonstrates only two predetermined standard deviation thresholds, $T_{\sigma,12}$ and $T_{\sigma,23}$, and two predetermined mean thresholds, $T_{\mu,12}$ and $T_{\mu,23}$, it is to be understood that the threshold graph 104 could instead include only one of the predetermined standard deviation thresholds $T_{\sigma,12}$ and $T_{\sigma,23}$ and/or one of the predetermined mean thresholds $T_{\mu,12}$ and $T_{\mu,23}$, or more than two of each of predetermined standard deviation thresholds $T_{\sigma,12}$ and $T_{\sigma,23}$ and/or the predetermined mean thresholds $T_{\mu,12}$ and $T_{\mu,23}$. Therefore, the threshold comparator 104 can have a variety of combinations of predetermined thresholds with which to compare the statistical parameter.

Figure 4:
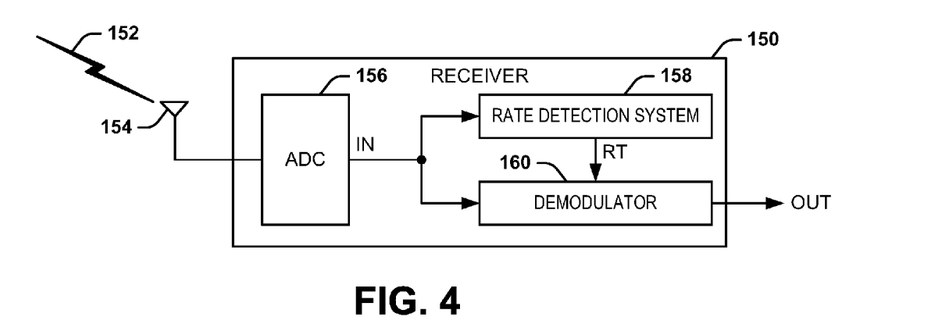
FIG. 4 illustrates an example of a receiver system.

FIG. 4 illustrates an example of a receiver system 150. The receiver system 150 can correspond to any of a variety of receiver systems that can receive a transmitted signal. In the example of FIG. 4, the transmitted signal is demonstrated as a wireless signal 152 that is received at an antenna 154. The antenna 154 can provide the transmitted signal to an ADC 156 that is configured to convert the transmitted signal into the input signal IN, similar to as described previously in the examples of FIGS. 1 and 2. The input signal IN is thus provided to a rate detection system 158, which can be configured substantially similar to the rate detection system 10 and/or the rate detection system 50 in the respective examples of FIGS. 1 and 2. Similar to as described previously, the ADC 156 could be omitted, such that the input signal IN provided to the rate detection system 158 can be analog, such that the rate detection system 158 can include an ADC that can convert the processed input signal IN to the digital domain.

The rate detection system 158 can be configured to determine the symbol rate RT of the input signal IN, such as similar to as described herein. For example, the rate processing component 158 can provide the statistical evaluation of a ratio of energy profiles to determine the symbol rate RT, such as based on comparing a statistical parameter associated with the sample mean of the ratio with at least one predetermined threshold and/or comparing a statistical parameter associated with the sample standard deviation of the ratio with at least one predetermined threshold. As another example, the rate processing component 158 can provide the statistical evaluation of a ratio of energy profiles to determine the symbol rate RT based on calculating a maximum QoS based on a Gaussian density function associated with the ratio of the respective energy profiles relative to each of the plurality of predetermined symbol rates. As yet another example, the rate processing component 158 can provide the statistical evaluation of a ratio of energy profiles to determine the symbol rate RT based on maximizing the likelihood function corresponding to the F-distribution associated with the ratio of the respective energy profiles relative to each of the plurality of predetermined symbol rates. As yet a further example, the rate processing component 158 can provide the statistical evaluation of a ratio of energy profiles to determine the symbol rate RT based on a combination of the different statistical evaluations described herein. Accordingly, the rate detection system 50 can operate in a variety of ways. In response to determining the symbol rate RT, a demodulator 160 can be configured to demodulate the input signal IN based on the symbol rate RT to provide an associated baseband data signal.

Figure 5:
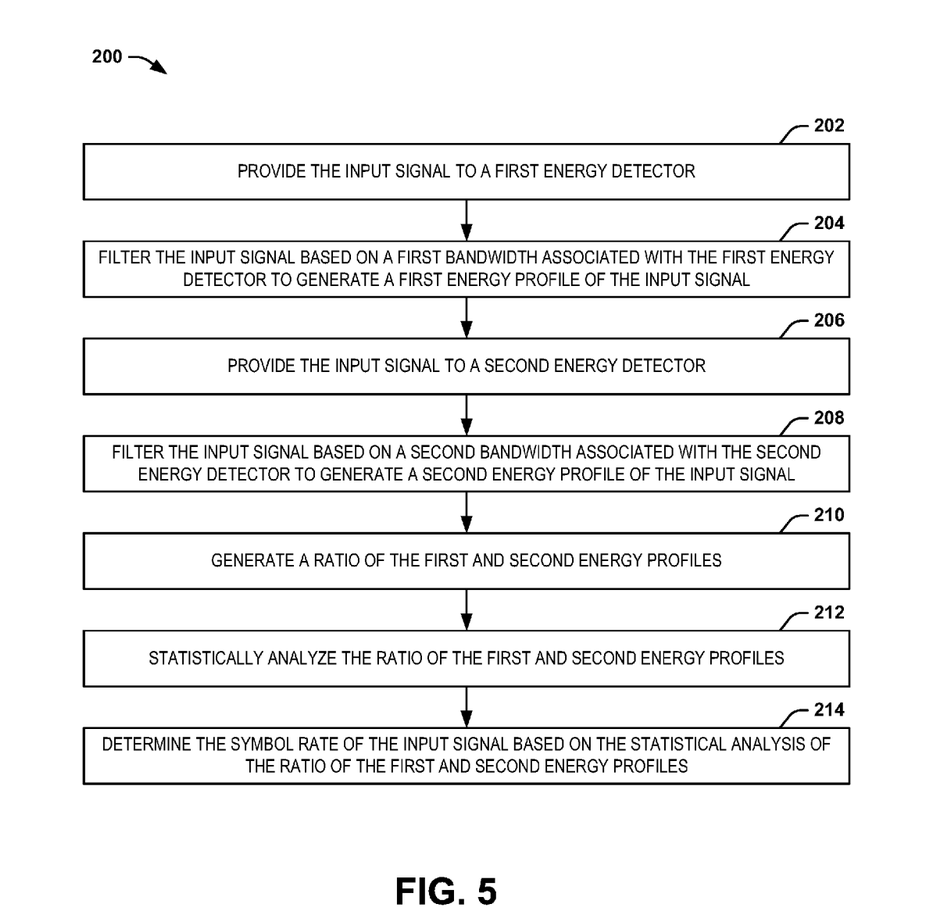
FIG. 5 illustrates an example of a method for detecting a symbol rate of an input signal.

In view of the foregoing structural and functional features described above, a methodology in accordance with various aspects of the present disclosure will be better appreciated with reference to FIG. 5. While, for purposes of simplicity of explanation, the methodology of FIG. 5 is shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features may be required to implement a methodology in accordance with an aspect of the present disclosure.

FIG. 5 illustrates an example of a method 200 for detecting a symbol rate (e.g., the symbol rate RT) of an input signal (e.g., the input signal IN). At 202, the input signal is provided to a first energy detector (e.g., the first energy detector 52). At 204, the input signal is filtered based on a first bandwidth associated with the first energy detector to generate a first energy profile (e.g., the first energy profile $E_1$) of the input signal. At 206, the input signal is provided to a second energy detector (e.g., the second energy detector 54). At 208, the input signal is filtered based on a second bandwidth associated with the second energy detector to generate a second energy profile (e.g., the second energy profile $E_2$) of the input signal. The second bandwidth can be partially overlapping with respect to the first bandwidth. At 210, a ratio (e.g., the ratio r) of the first and second energy profiles is generated. At 212, the ratio of the first and second energy profiles is statistically analyzed. At 214, the symbol rate of the input signal is determined based on the statistical analysis of the ratio of the first and second energy profiles.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A rate detector system comprising:
   a plurality of energy detectors to receive an input signal and to filter separate respective frequency bands associated with the input signal to generate separate respective energy profiles; and
   a rate processing component to determine a symbol rate of the input signal based on a statistical evaluation of a ratio of the separate respective energy profiles.

2. The system of claim 1, wherein each of the plurality of energy detectors comprises:
   a signal filter to filter the input signal into a respective one of the separate respective frequency bands; and
   a smoothing function component to smooth the respective one of the separate respective energy profiles over a predetermined duration of the input signal.

3. The system of claim 1, wherein the rate processing component comprises:
   a ratio calculator to divide the separate respective energy profiles to calculate an energy ratio;
   a decision logic component to determine the symbol rate of the input signal based on the statistical evaluation of the energy ratio.

4. The system of claim 1, wherein the rate processing component determines that the symbol rate of the input signal is one of a plurality of predetermined symbol rates based on comparing a statistical parameter associated with the ratio of the separate respective energy profiles relative to at least one predetermined threshold.

5. The system of claim 4, wherein the statistical parameter associated with the ratio of the separate respective energy profiles comprises at least one of a sample standard deviation and a sample mean of the ratio of the separate respective energy profiles.

6. The system of claim 1, wherein the rate processing component determines that the symbol rate of the input signal is one of a plurality of predetermined symbol rates based on calculating a maximum Quality of Service (QoS) based on a Gaussian density function associated with the ratio of the separate respective energy profiles relative to each of the plurality of predetermined symbol rates.

7. The system of claim 1, wherein the rate processing component determines that the symbol rate of the input signal is one of a plurality of predetermined symbol rates based on maximizing a likelihood function corresponding to an F-distribution associated with the ratio of the separate respective energy profiles relative to each of the plurality of predetermined symbol rates.

8. The system of claim 1, wherein the plurality of energy detectors comprise a respective plurality of filters to filter the separate respective frequency bands associated with the input signal and to generate separate respective energy profiles, wherein the plurality of filters comprise a respective plurality of partially overlapping bandwidths.

9. A receiver system comprising the rate detector system of claim 1, the receiver further comprising:
an antenna to receive the input signal as a wireless input signal;
an analog-to-digital converter (ADC) to convert the input signal to a digital input signal, the digital input signal being provided to the rate detector system; and
a demodulator to receive and demodulate the digital input signal based on the determined symbol rate of the digital input signal.

10. A method for detecting a symbol rate of an input signal, the method comprising:
providing the input signal to a first energy detector;
filtering the input signal based on a first bandwidth associated with the first energy detector to generate a first energy profile of the input signal;
providing the input signal to a second energy detector;
filtering the input signal based on a second bandwidth associated with the second energy detector to generate a second energy profile of the input signal, the second bandwidth being partially overlapping with respect to the first bandwidth;
generating a ratio of the first and second energy profiles;
statistically analyzing the ratio of the first and second energy profiles; and
determining the symbol rate of the input signal based on the statistical analysis of the ratio of the first and second energy profiles.

11. The method of claim 10, wherein statistically analyzing the ratio comprises determining at least one statistical parameter associated with the ratio of the first and second energy profiles, and wherein determining the symbol rate comprises determining that the symbol rate of the input signal is one of a plurality of predetermined symbol rates based on comparing the statistical parameter associated with the ratio of the first and second energy profiles relative to at least one predetermined threshold.

12. The method of claim 11, wherein statistically analyzing the ratio comprises determining at least one of a sample standard deviation and a sample mean of the ratio of the separate respective energy profiles, and wherein determining the symbol rate comprises determining that the symbol rate of the input signal is one of a plurality of predetermined symbol rates based on comparing the at least one of a sample standard deviation and a sample mean of the ratio of the separate respective energy profiles with the at least one predetermined threshold.

13. The method of claim 10, wherein statistically analyzing the ratio comprises calculating a maximum Quality of Service (QoS) based on a Gaussian density function associated with the ratio of the separate respective energy profiles, and wherein determining the symbol rate comprises determining that the symbol rate of the input signal is one of a plurality of predetermined symbol rates based on comparing the maximum QoS with a QoS associated with the plurality of predetermined symbol rates.

14. The method of claim 10, wherein statistically analyzing the ratio comprises calculating the likelihood function associated with the F-distribution associated with the ratio of the separate respective energy profiles, and wherein determining the symbol rate comprises determining that the symbol rate of the input signal is one of a plurality of predetermined symbol rates based on comparing the parameters that maximize the likelihood function associated with the F-distribution with the pre-computed set of parameters corresponding to the plurality of symbol rates that best match this maximizing set.

15. A receiver system comprising:
an antenna to receive a wireless input signal;
an analog-to-digital converter (ADC) to convert the wireless input signal to a digital input signal;
a rate detector to filter separate respective frequency bands associated with the input signal to generate separate respective energy profiles and to determine a symbol rate of the input signal based on a statistical evaluation of a ratio of the separate respective energy profiles; and
a demodulator to receive and demodulate the digital input signal based on the determined symbol rate of the digital input signal.

16. The system of claim 15, wherein the rate detector comprises a rate processing component to determine that the symbol rate of the input signal is one of a plurality of predetermined symbol rates based on comparing at least one of a sample standard deviation and a sample mean of the ratio of the separate respective energy profiles relative to at least one predetermined threshold.

17. The system of claim 15, wherein the rate detector comprises a rate processing component to determine that the symbol rate of the input signal is one of a plurality of predetermined symbol rates based on calculating a maximum Quality of Service (QoS) based on a Gaussian density function associated with the ratio of the separate respective energy profiles relative to each of the plurality of predetermined symbol rates.

18. The system of claim 15, wherein the rate detector comprises a rate processing component to determine that the symbol rate of the input signal is one of a plurality of predetermined symbol rates based on maximizing a likelihood function corresponding to an F-distribution associated with the ratio of the separate respective energy profiles relative to each of the plurality of predetermined symbol rates.

* * * * *